(12) United States Patent
Hornby

(10) Patent No.: US 7,306,168 B2
(45) Date of Patent: Dec. 11, 2007

(54) POLYMERIC BODIED FUEL INJECTOR WITH A SEAT AND ELASTOMERIC SEAL MOLDED TO A POLYMERIC SUPPORT MEMBER

(75) Inventor: Michael J. Hornby, Williamsburg, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 124 days.

(21) Appl. No.: 11/014,692

(22) Filed: Dec. 20, 2004

(65) Prior Publication Data

US 2005/0133631 A1   Jun. 23, 2005

Related U.S. Application Data

(60) Provisional application No. 60/531,206, filed on Dec. 19, 2003.

(51) Int. Cl.
*F02M 47/02* (2006.01)
*F02M 59/00* (2006.01)
*B05B 1/30* (2006.01)

(52) U.S. Cl. ............... 239/88; 239/533.2; 239/533.12; 239/533.14; 239/585.1; 239/585.4; 239/585.5

(58) Field of Classification Search ............ 239/88–93, 239/533.2, 533.9, 533.12, 533.13, 533.14, 239/585.1–585.5; 251/129.15, 129.21, 127; 29/890.124, 890.127
See application file for complete search history.

(56) References Cited

U.S. PATENT DOCUMENTS

| | | | |
|---|---|---|---|
| 3,769,117 A | 10/1973 | Bowen et al. | |
| 4,951,878 A | 8/1990 | Casey et al. | |
| 5,081,766 A * | 1/1992 | Kellum et al. | 29/890.13 |
| 5,150,842 A | 9/1992 | Hickey | |
| 5,159,915 A | 11/1992 | Saito et al. | |
| 5,544,816 A * | 8/1996 | Nally et al. | 239/585.5 |
| 5,803,983 A | 9/1998 | Simandl et al. | |
| 5,823,445 A * | 10/1998 | Sofer | 239/585.1 |
| 5,893,959 A | 4/1999 | Muellich | |
| 5,915,626 A | 6/1999 | Awarzamani et al. | |
| 5,944,262 A | 8/1999 | Akutagawa et al. | |
| 5,979,866 A * | 11/1999 | Baxter et al. | 251/129.21 |
| 5,996,910 A | 12/1999 | Takeda et al. | |
| 5,996,911 A | 12/1999 | Gesk et al. | |
| 6,105,884 A * | 8/2000 | Molnar et al. | 239/585.1 |

(Continued)

*Primary Examiner*—Davis Hwu

(57) ABSTRACT

A fuel injector is described that includes a polymeric housing, pole piece, filter assembly, coil assembly, spring member, armature assembly and metering assembly. The polymeric housing has a passageway extending between an inlet and an outlet along a longitudinal axis. The pole piece is disposed in the passageway, the pole piece having a through opening. The filter assembly has a portion disposed in the through opening of the pole piece. The coil assembly is disposed in the polymeric housing to surround the pole piece. The spring member is disposed partly in the pole piece and including a spring portion contiguous with the portion of the filter assembly. The armature assembly is disposed in the passageway in a first position having a first portion confronting the pole piece and in a second position having a closure member contiguous to an end face of the pole piece. The metering assembly is secured to the polymeric housing proximate the outlet. The metering assembly has a seat secured to a polymeric support member. The seat has a sealing member disposed between the seat and the polymeric support member. A method of sealing a fuel injector is described.

17 Claims, 3 Drawing Sheets

U.S. PATENT DOCUMENTS

| | | |
|---|---|---|
| 6,193,833 B1 | 2/2001 | Gizowski et al. |
| 6,328,232 B1 * | 12/2001 | Haltiner et al. .......... 239/585.1 |
| 6,386,467 B1 | 5/2002 | Takeda |
| 6,464,153 B1 | 10/2002 | Bonnah, II et al. |
| 6,465,757 B1 | 10/2002 | Chen |
| 6,589,380 B2 | 7/2003 | Gnage |
| 6,596,122 B1 | 7/2003 | Saviski et al. |
| 6,631,857 B2 | 10/2003 | Ibrahim et al. |
| 6,782,869 B2 | 8/2004 | Blakley |
| 6,802,929 B2 | 10/2004 | Ruotsalainan |
| 2004/0031562 A1 | 2/2004 | Kaiser et al. |
| 2004/0031777 A1 | 2/2004 | Bauer et al. |
| 2004/0112519 A1 | 6/2004 | Mori |
| 2004/0154737 A1 | 8/2004 | Chen et al. |
| 2004/0231788 A1 | 11/2004 | Chen et al. |

* cited by examiner

POLYMERIC BODIED FUEL INJECTOR WITH A SEAT AND ELASTOMERIC SEAL MOLDED TO A POLYMERIC SUPPORT MEMBER

PRIORITY

This application claims the benefits under 35 U.S.C. § 119 based on Provisional Application Ser. No. 60/531,206, entitled "Plastic Bodied Fuel Injector," and filed on Dec. 19, 2003, which application is incorporated herein in its entirety into this application.

BACKGROUND OF THE INVENTION

Examples of known fuel injection systems use an injector to dispense a quantity of fuel that is to be combusted in an internal combustion engine. The quantity of fuel that is dispensed is varied in accordance with a number of engine parameters such as engine speed, engine load, engine emissions, etc.

Known electronic fuel injection systems monitor at least one of the engine parameters and electrically operate the injector to dispense the fuel. It is believed that examples of known injectors use electro-magnetic coils, piezoelectric elements, or magnetostrictive materials to actuate a valve.

A known fuel injector utilizes a plethora of internal components such as a metallic inlet tube connected to a valve body via a non-magnetic shell with a pole piece interposed there between. The inlet tube, valve body, non-magnetic shell and pole piece are generally affixed to each other after a closure assembly and a metering assembly are disposed in the valve body. A solenoid coil is inserted over the assembled components and the entire assembly is molded into the fuel injector.

It is believed that one known fuel injector utilizes a plastic body molded over a solenoid coil to provide a plastic inlet fuel passage with a metallic valve body being coupled to the solenoid coil.

It is believed that another known fuel injector utilizes two separate subassemblies to form the fuel injector. The first subassembly can include a complete coil assembly and electrical connector molded into an outer casing to provide a power group. The second subassembly can include an inlet tube, pole piece, non-magnetic shell valve body, closure assembly and metering assembly affixed together to form a stand alone fuel group. The two sub-assemblies are formed separately and coupled together to provide an operable fuel injector.

While the known fuel injectors are suited to the task of metering fuel, it is believed that the known fuel injectors may have certain assembly or component drawbacks that require extensive manufacturing process to be undertaken to ensure that the injector are suitable for commercial applications. They can include, for example, the necessity for multiple seal points between components to provide leak integrity in the injector and a large number of manufacturing steps that are undertaken. These seals can be effectuated by elastomeric seals, such as, O-rings, or multiple hermetic welds to ensure structural and leak integrity of the known fuel injectors. Others include the potential manufacturing difficulties associated with thermal distortion in welding multiple metallic components at close proximity to each other or the need for a metal valve body with internal resilient seals for leak integrity. Yet another drawback can include the utilization of lift setting components that must be inserted into the valve body of the fuel injector. Thus, it would be advantageous to reduce or even eliminate some of these drawbacks.

SUMMARY OF THE INVENTION

The present invention provides for, in one aspect, a fuel injector that is believed to reduce or eliminate these drawbacks of the known fuel injectors while maintaining substantially the same operative performance. The fuel injector of the present invention utilizes a minimal number of seal points and is designed so that an interface between dissimilar materials in a metering assembly is provided by an elastomeric member.

According to one aspect of the present invention, the fuel injector includes a polymeric housing, pole piece, filter assembly, coil assembly, spring member, armature assembly and metering assembly. The polymeric housing has a passageway extending between an inlet and an outlet along a longitudinal axis. The pole piece is disposed in the passageway, the pole piece having a through opening. The filter assembly has a portion disposed in the through opening of the pole piece. The coil assembly is disposed in the polymeric housing to surround the pole piece. The spring member is disposed partly in the pole piece and including a spring portion contiguous with the portion of the filter assembly. The armature assembly is disposed in the passageway in a first position having a first portion confronting the pole piece and in a second position having a closure member contiguous to an end face of the pole piece. The metering assembly is secured to the polymeric housing proximate the outlet. The metering assembly has a seat secured to a polymeric support member. The seat has a sealing member disposed between the seat and the polymeric support member.

In yet another aspect, the present invention provides for a method of sealing a fuel injector. The fuel injector has a polymeric body that extends from an inlet to an outlet along a longitudinal axis. The fuel injector has a seat secured to a polymeric support member. The method can be achieved by interposing an elastomeric member proximate an interface between an outer surface of the seat and an inner surface of the polymeric support member; and bonding the polymeric support member to the polymeric body proximate the outlet.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENTS

Figure 1:
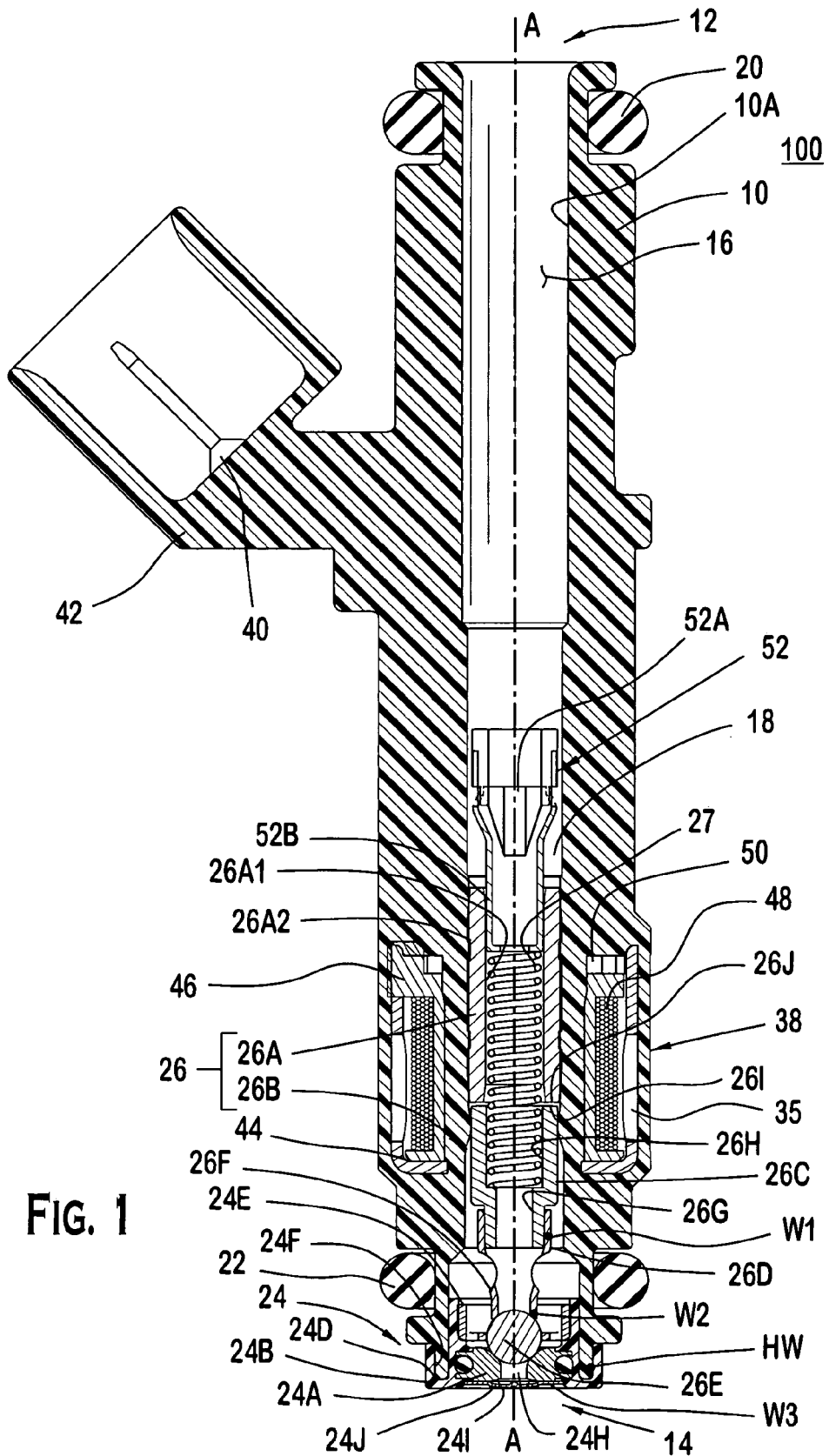
FIG. 1 is a representation of a fuel injector according a preferred embodiment.
Figure 2:
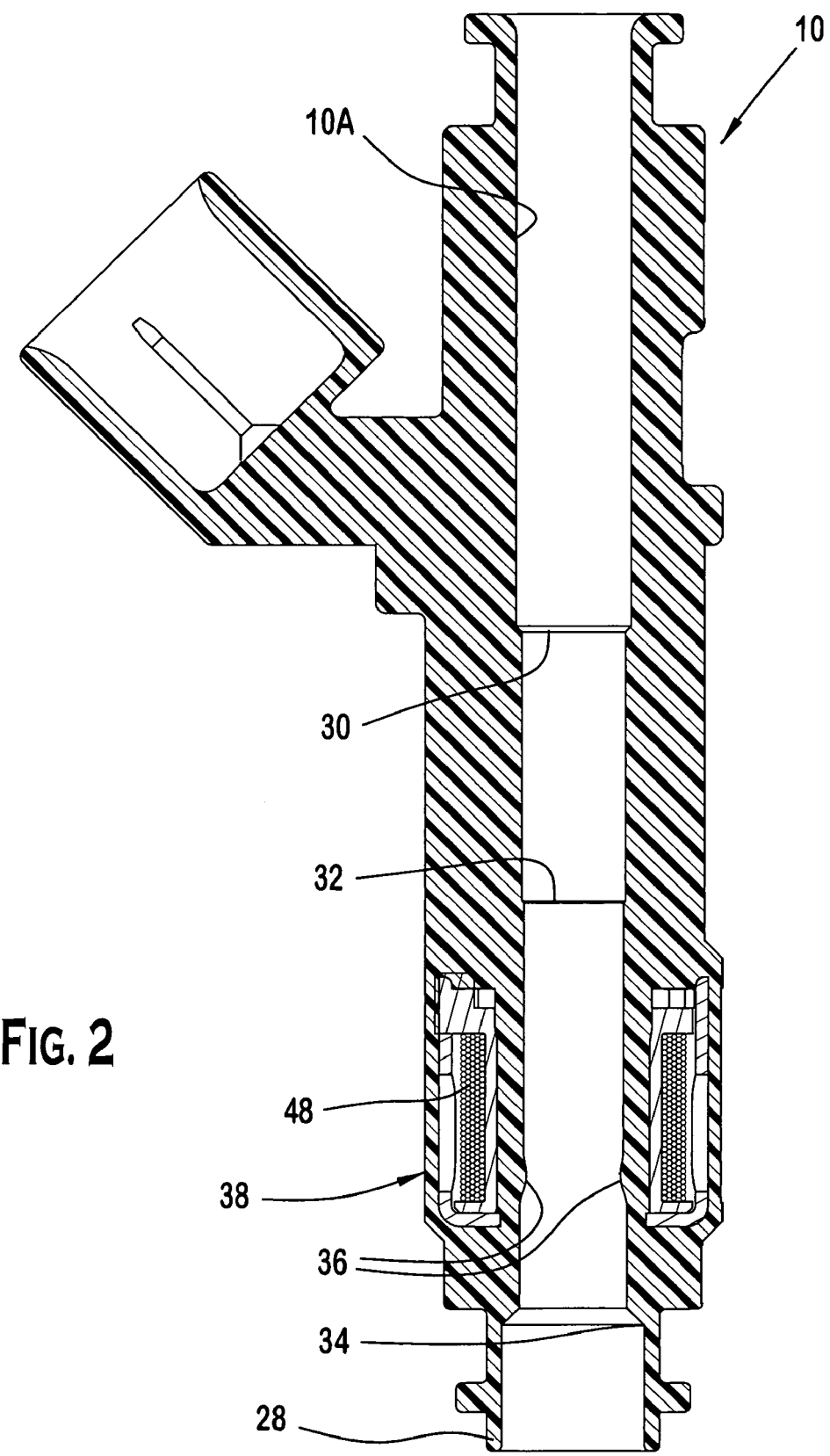
FIG. 2 illustrates a fuel injector housing for the fuel injector of FIG. 1.

FIGS. 1-3 illustrate the preferred embodiments of a fuel injector 100. Referring to FIG. 1, the fuel injector 100 includes a continuous polymeric body 10 extending from an inlet 12 to an outlet 14 along a longitudinal axis A-A. The polymeric body 10 includes a polymeric wall surface 10A that directly faces the longitudinal axis A-A to define a first passage 16 in which fuel can flow from the inlet 12. The first passage 16 extends from the inlet 12 to communicate with a second passage 18 formed by a plurality of internally mounted components. The first passage 16 includes the polymeric bore 10A that extends from a first external seal 20 proximate the inlet 12 to a second external seal 22 proximate an outlet 14 along the longitudinal axis A-A. Disposed within a portion of the polymeric bore 10A is a metering assembly 24 proximate the second external seal 22. A closure assembly 26 is disposed proximate the metering assembly 24, which is coupled to a rim portion 28 at the outlet end 14 of the polymeric body 10. A portion of the closure assembly 26 is disposed in the polymeric bore 10A and between the first and second external seals 20, 22. The first passage 16 can be provided with a plurality of stepped surfaces 30, 32, and 34 (FIG. 2) that define a plurality of diameters for the polymeric bore 10A. The polymeric bore 10A can also include an inward (i.e., towards the longitudinal axis A-A) surface to define a guide surface 36 (FIG. 2) for a reciprocable closure member. The inward surface preferably includes a tapered surface 36. The polymeric body can be formed from a suitable polymeric material such as, for example, Nylon 6-6 with about 30 percent glass filler.

As shown in FIG. 2, the polymeric body 10 provides a complete solenoid coil subassembly that is ready for assembly with the metering and armature assemblies. In particular, the polymeric body 10 includes a solenoid coil assembly 38 disposed within the polymeric body 10 so that no part of the coil assembly 38 extends outside the boundary of the polymeric body 10. The solenoid coil assembly 38 is connected to at least one electrical terminal 40 formed on an electrical connector portion 42 of the polymeric body 10. The terminal 40 and the electrical harness connector portion 42 can engage a mating connector, e.g., part of a vehicle wiring harness (not shown), to facilitate connecting the injector 100 to an electrical power supply (not shown) for energizing the electromagnetic coil 48.

The coil assembly 38 includes a coil housing 44 disposed about the longitudinal axis A-A to surround a bobbin 46 and at least one wire coiled about the bobbin 46 to form an electromagnetic coil 48. The coil housing 44, which provides a return path for magnetic flux, generally takes the shape of a ferro-magnetic cylinder surrounding the electromagnetic coil 48. A flux washer 50 can abut a top surface of the bobbin 46 so that the flux washer 50 is in physical contact with the coil housing 44. The flux washer 50 can be integrally formed with or separately attached to the coil housing 44. The coil housing 44 can include holes 35, slots, or other features to break up eddy currents, which can occur when the coil 48 is de-energized.

The coil assembly 38 can be preferably constructed as follows. A plastic bobbin 46 is molded with at least one electrical contact extending from the bobbin 46 so that the peripheral edge of the contact can be mated with a contact terminal for electrical communication between the coil and a power source. A wire for the electromagnetic coil 48 is wound around the plastic bobbin 46 a predetermined number of times and connected to the at least one electrical contact portion. The electromagnetic coil 48 (with bobbin 46) is placed into the coil housing 44. An electrical terminal 40, which is pre-bent to a desired geometry, is then electrically connected to each electrical contact portion provided on the bobbin 46. Thereafter, the polymeric body 10 can be formed by a suitable technique such as, for example, thermoset casting, compression molding or injection molding. The polymeric body 10, e.g., an overmold, provides a structural casing for the injector 100 and provides predetermined electrical and thermal insulating properties. In a preferred embodiment, the polymeric body 10 is formed by injection molding around the coil assembly 38 and the electrical connector 40, i.e., an insert-molding so that the metering assembly can be affixed to the polymeric body 10. The insert-molding hermetically seals the coil assembly 38 from contamination with fuel flow through the polymeric fuel passage 16.

Figure 3A:
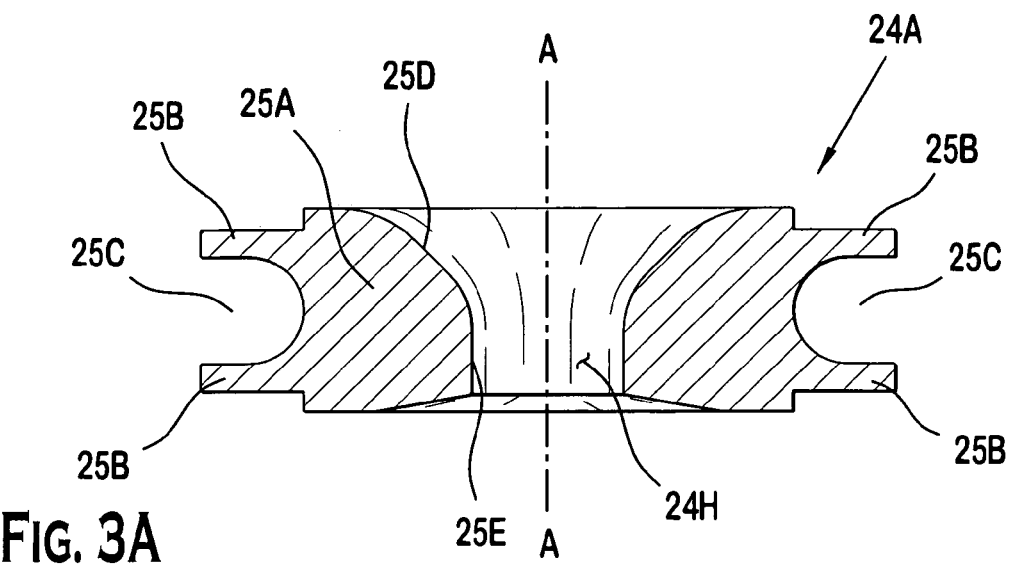
FIG. 3A is a cross-sectional view of the valve seat for the fuel injector housing of FIG. 1.
Figure 3B:
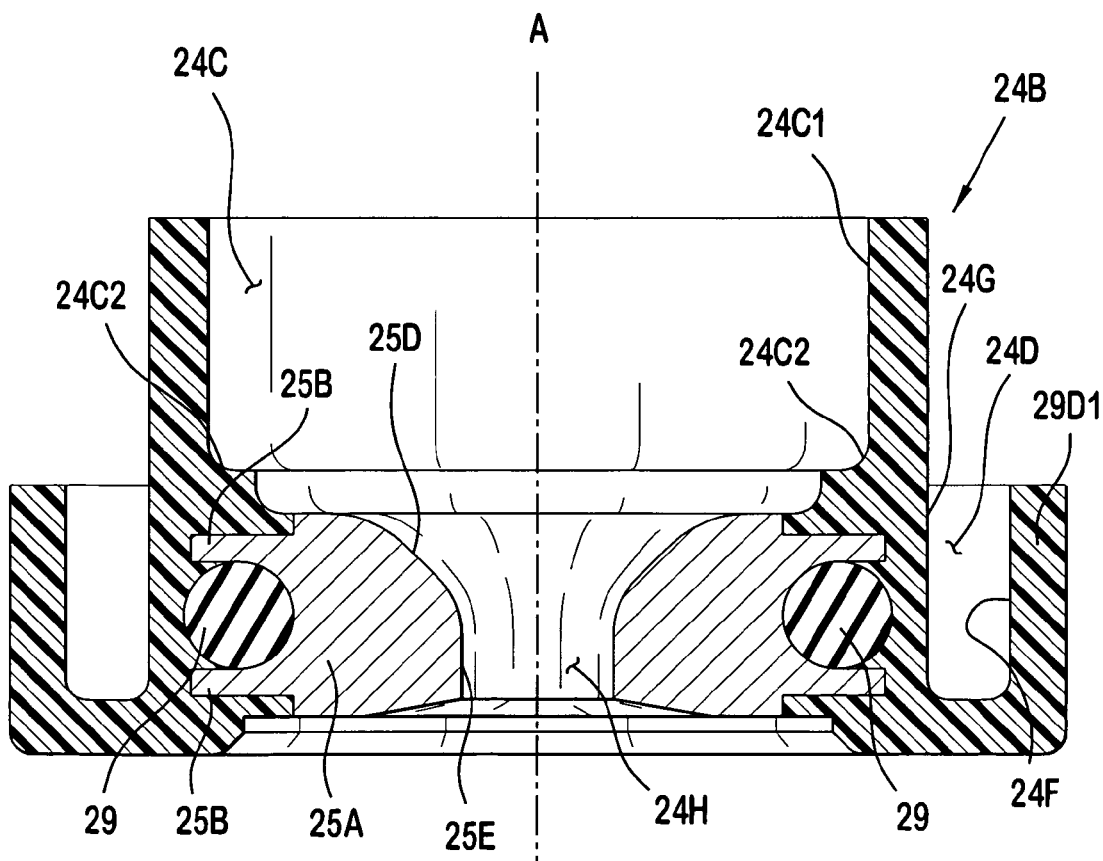
FIG. 3B illustrates a cross-sectional view of the valve seat molded to a polymeric support member for the fuel injector of FIG. 1.

Referring to FIGS. 1 and 3B, the metering assembly 24 includes a seat 24A that can be any suitable material such as, for example, plastic, ceramic or metal, long as it provides a suitably sealing surface. In the preferred embodiments, the seat 24A is formed of metallic material, and is secured to a polymeric support member 24B with an elastomeric member 29 disposed between the seat 24A and the support member 24B.

As shown in FIG. 3A, the seat 24A has a body 25A with peripheral retention portion 25B provided with fingers to define an annular pocket 25C on which the elastomeric member 29 is mounted. The retention portion 25B can include a suitable retention structure such as, for example, fingers, barbs or a combination of both. In the preferred embodiments, the retention portion 25B includes two fingers disposed about the pocket 25C. The body 25A includes seat surface 25D contiguous to orifice surface 25E that defines seat orifice 24H. The seat orifice 24H is generally centered on the longitudinal axis A-A and through which fuel can flow into the internal combustion engine (not shown). The sealing surface 25D, which faces the interior of polymeric bore 10A, can be frustoconical or concave in shape, and can have a finished surface. The metallic seat 24A can be formed by a suitable technique such as, for example, casting, machining or a combination of both.

A metering disc 24I can be used in connection with the seat 24A to provide at least one precisely sized and oriented metering orifice 24J in order to obtain a particular fuel spray pattern. The precisely sized and oriented metering orifice 24J can be disposed on the center axis of the metering disc 24I or, preferably, the metering orifice 24J can disposed off-axis, and oriented in any desirable angular configuration relative to one or more reference points on the fuel injector 100. Preferably, the metallic seat 24A is a stainless steel seat insert molded into the support member 24B.

As shown in FIG. 3B, the support member 24B includes a first pocket 24C defined by a cylindrical portion 24C1 to receive a cup-shaped guide member 24E (FIG. 1). The cup-shaped guide member 24E can be formed from a suitable material such as, for example, polymeric, ceramic or metallic. Preferably, the guide member 24E is stamped metallic member press-fitted into the first pocket 24C to a predetermined location with respect to the seat 24A via boss extension 24C2 formed in the first pocket 24C. The cup-shaped guide member 24E (FIG. 1) includes an aperture disposed about the longitudinal axis A-A and at least one aperture offset with respect to the longitudinal axis A-A. The support member 24B also includes a second pocket 24D defined by an outer cylindrical surface 24G of wall portion 24C 1 and an inner surface 24F of cylindrical portion 29D1. The second pocket 24D is configured to receive the rim portion 28 of the outlet 14 end of the polymeric body 10. Preferably, the second pocket 24D is configured so that a locational clearance fit is formed between the rim portion 28 of the polymeric body 10 and the inner wall surface 24F of the annular cylinder 29D1 and the outer surface 24G of the inner cylinder of the first pocket 24C. The metallic seat 24A can be provided with the polymeric support member 24B by a suitable technique such as, for example, insert molding the metallic seat 24A with a suitable polymeric material. Preferably, the material used for the polymeric body, support member and bobbin in the preferred embodiments is Nylon 6-6 with about 30% by weight glass filler.

Referring to FIG. 1, the closure assembly 26 includes a pole piece 26A and an armature assembly 26B configured to be magnetically coupled to the solenoid coil assembly 38 in a fully assembled fuel injector 100. The pole piece 26A can be formed as a cylindrical component with a passage 26A1 extending through the pole piece 26A. The pole piece passage 26A1 includes a resilient member 27 disposed in the pole piece passage 26A1. The outer surface of the pole piece 26A can be provided with recesses or projections 26A2 to assist in retention of the pole piece 26A (and any flashing of the polymeric bore in the recesses) once the pole piece 26A has been press-fitted to a desired location in the polymeric bore 10A of FIG. 2.

Referring to FIG. 1, a filter assembly 52 with a filter element 52A and an adjusting tube 52B is also disposed in the polymeric bore 10A. As shown, the filter assembly 52 includes a first end and a second end. The filter element 52A is along a central portion of the filter assembly 52. The adjusting tube 52B is disposed in the pole piece passage 26A1. The adjusting tube 52B engages the resilient member 27 and adjusts the biasing force of the resilient member 27 with respect to the pole piece 26A. Alternatively, a filter element 52A can be retained at the inlet end 12.

In the preferred embodiments, the adjusting tube 52B provides a reaction member against which the resilient member 27 reacts in order to close the armature assembly 26B when the solenoid coil assembly 38 is de-energized. The position of the adjusting tube 52B can be retained with respect to the pole piece 26A or the polymeric body 10 by an interference fit between an outer surface of the adjusting tube 52B and an inner surface of the pole piece passage 26A1. Thus, the position of the adjusting tube 52B with respect to the pole piece 26A can be used to set a predetermined dynamic characteristic of the armature assembly 26B.

Referring to FIG. 1, the armature assembly 26B includes an armature 26C secured to an elongated member 26D by weld W1, which is secured to a closure member 26E by weld W2. The closure member 26E can be of any suitable shape, such as, for example, cylindrical, semi-spherical or spherical. In the case of a spherical shaped closure member 26E, i.e., a spheroidal member, the spheroidal member can be connected to the elongated member 26D at a diameter that is less than the diameter of the spheroidal member. Such a connection would be on side of the spheroidal member that is opposite contiguous contact with the seat 24A. As noted earlier, the armature lower guide 24E can be disposed in the first pocket 24C of the polymeric support member 24B, proximate the seat 24A, and would slidingly engage the outer surface of the spherical closure member. The lower armature lower guide 24E can facilitate alignment of the armature assembly 26B along the longitudinal axis A-A, and can reduce flux leakage to the closure member 26E.

Alternatively, the armature assembly 26B can be formed by securing an armature 26C directly to the closure member 26E. At least one aperture 26F can be formed through a wall of the elongated member 26D. The apertures 26F, which can be of any shape, are preferably non-circular, e.g., axially elongated, to facilitate the passage of gas bubbles. For example, in the case of a separate armature tube that is formed by rolling a sheet substantially into a tube, the apertures can be an axially extending slit defined between non-abutting edges of the rolled sheet. However, the apertures 26F, in addition to the slit, would preferably include openings extending through the sheet. The apertures 26F provide fluid communication between the armature passage 26G and the fuel inlet passage 16. Details of the alternative armature assembly are also described in the copending application Ser. No. 11/014,694, which is incorporated by reference herein.

The closure member 26E is movable between a closed configuration, as shown in FIG. 1, and an open configuration (not shown). In the closed configuration, the closure member 26E contiguously engages a seat surface of the metallic seat 24A to prevent fluid flow through the seat orifice 24H. In the open configuration, the closure member 26E is spaced from the seat surface 25D to permit fluid flow through the seat orifice 24H.

A radial end face 26I of the armature 26C is configured to contact a radial end face 26J of the pole piece 26A when the armature 26C is moved by magnetic flux generated by the solenoid coil assembly 38. In the embodiment illustrated in FIG. 1, the armature 26C is provided with a deep counterbore 26H to receive the other end of the preload resilient element 27. In the alternative embodiment of the armature assembly where the armature is connected directly to the closure member, no counterbore 26H is provided and the end of the resilient element 27 is configured to abut the radial end face 26I of the armature 26C. The armature 26C can be formed by a suitable technique such as, for example, casting, machining, stamping, deep drawing or combinations thereof.

In the preferred embodiments illustrated in FIG. 1, surface treatments can be applied to at least one of the end face of the pole piece 26A or the armature 26C to improve the armature's response, reduce wear on the impact surfaces and variations in the working air gap between the respective end faces. The surface treatments can include coating, plating or case-hardening. Coatings or platings can include, but are not limited to, hard chromium plating, nickel plating or keronite coating. Case hardening on the other hand, can include, but are not limited to, nitriding, carburizing, carbo-nitriding, cyaniding, heat, flame, spark or induction hardening.

The surface treatments will typically form at least one layer of wear-resistant materials on the respective end faces. These layers, however, tend to be inherently thicker wherever there is a sharp edge, such as between junction between the circumference and the radial end face of either portions. Further, this thickening effect results in uneven contact surfaces at the radially outer edge of the end portions. However, by forming the wear-resistant layers on at least one of the end faces, where at least one end portion has a surface generally oblique to longitudinal axis A-A, both end faces can be substantially in even contact with respect to each other when the solenoid coil assembly 38 is energized.

Since the surface treatments may affect the physical and magnetic properties of the ferromagnetic portion of the armature assembly 26B or the pole piece 26A, a suitable material, e.g., a mask, a coating or a protective cover, surrounds areas other than the respective end faces during the surface treatments. Upon completion of the surface treatments, the material is removed, thereby leaving the previously masked areas unaffected by the surface treatments.

Although both embodiments illustrate an armature 26C of about the same length, other lengths (e.g., shorter or longer) can be provided by implementing a different length elongated member 26D and corresponding polymeric body 10 or a different length stamped armature 26C and corresponding polymeric body 10 in the embodiment of FIG. 1.

According to the preferred embodiments, the magnetic flux generated by the electromagnetic coil 48 flows in a circuit that includes the pole piece 26A, the armature assembly 26B, the coil housing 44, and the flux washer 50. The magnetic flux moves along the coil housing 44 to the base of the coil housing 44, through the polymeric body 10 across a radial (relative to axis A-A) or parasitic airgap to the armature 26C, and across an axial (relative to axis A-A) or working air gap towards the pole piece 26A, thereby lifting the armature 26C and closure member 26E off the seat 24A.

As can further be seen in FIG. 1, the thickness of the cross-section of the impact surface of pole piece 26A is greater than the thickness of the cross-section of the impact surface of the armature 26C. The smaller cross-sectional area allows the armature 26C to be lighter, and at the same time, causes the magnetic flux saturation point to be formed near the working air gap between the pole piece 26A and the armature 26C, rather than within the pole piece passage 26A1. Furthermore, since the armature 26C is partly within the interior of the electromagnetic coil 48, the magnetic flux is believed to be denser, leading to a more efficient electromagnetic coil 48. In the embodiment of FIG. 1, the ferromagnetic closure member 26E is magnetically decoupled from the armature 26C via the non-magnetic elongated member 26D, which reduces flux leakage of the magnetic circuit, thereby improving the efficiency of the electromagnetic coil 48.

In the preferred embodiments, the fuel injector 100 can be assembled as follows. A polymeric fuel injector body 10 with an insert-molded solenoid coil assembly 38 is provided, as shown in FIG. 2. The metering assembly 24 is fitted onto the rim portion 28 of the outlet 14 of the polymeric housing 10 and these components are then bonded to each other by a suitable bonding technique such as, for example, UV light activated adhesive, thermal bonding, or laser welding to form a hermetic seal HW. Details of the techniques to form the hermetic seal HW via adhesive bonding or laser bonding are also disclosed in copending U.S. Patent Application Ser. No. 11/014,693, entitled "Method of Polymeric Bonding A Polymeric Fuel Component to Another Polymeric Fuel Component," filed on the same date as this application, which copending application is incorporated herein by reference in its entirety into this application.

The armature assembly 26B is inserted into the polymeric bore 10A for contiguous engagement with the metering assembly 24, which form a valve assembly 31 (FIGS. 2D and 2E) that regulates flow of fuel from the fuel injector 100. The pole piece 26A is press-fitted to a predetermined location within the polymeric bore 10A so that a lift distance (i.e., the distance the armature assembly 26B travels to close a working air gap with the pole piece 26A) of the armature assembly 26B is defined by this predetermined location. The resilient element 27 is inserted into the pole piece passage 26A1 so that one end contiguously engages the closure assembly. The filter assembly 52 is press-fitted into the pole piece passage 26A1 so that a distal end of the filter assembly 52 preloads the resilient element 27 against the armature assembly 26B to provide for the closure assembly 26. The external seals, preferably Viton O-rings, are installed on recessed portions proximate the inlet 12 and outlet 14 of the fuel injector 100. At this point, the fuel injector 100 is ready to be calibrated before being tested. The calibration can involve modifying the preload force of the resilient element 27 such as, for example, by repositioning the adjusting tube/filter assembly 52 along axis A-A while flowing fuel through the fuel injector 100 to achieve a desired opening time for the closure member 26E. Subsequently, the fuel injector 100 can be tested (e.g., flow or leak testing) prior to being shipped to customers.

In operation, the electromagnetic coil 48 is energized, thereby generating magnetic flux in the magnetic circuit. The magnetic flux moves armature assembly 26B (along the axis A-A, according to a preferred embodiment) towards the pole piece 26A to close the working air gap. This movement of the armature assembly 26B separates the closure member 26E from the seat 24A and allows fuel to flow from the fuel rail (not shown), through the polymeric inlet bore passage 16, the pole piece passage 26A1, the through-bore 26G of the armature 26C, the apertures to between the seat 24A and the closure member 26E, through the seat orifice 24H, and finally through the metering disc 24I into the internal combustion engine (not shown). When the electromagnetic coil 48 is de-energized, the armature assembly 26B is moved by the bias force of the resilient member 27 to contiguously engage the closure member 26E with the seat 24A, and thereby prevent fuel flow through the injector 100.

By virtue of the preferred embodiments, a method of sealing the fuel injector described above can be provided. The method can be achieved by interposing an elastomeric member 29G proximate an interface between an outer surface (e.g., pocket 25E) of the seat 24A and an inner surface 29D of the polymeric support member 24B; and bonding the polymeric support member 24B to the polymeric body 10 proximate the outlet 14. The step of interposing the elastomeric member can include insert molding a metallic seat 24A with the elastomeric member to form the polymeric support member. The insert molding can also include forming a pocket on an outer surface of the metallic seat to retain the elastomeric member during the insert molding.

Details of the preferred embodiments are also described in the following copending applications: (1) "Polymeric Bodied Fuel Injector," Ser. No. 11/014,694; (2) "Method of Polymeric Bonding Fuel System Components," Ser. No. 11/014,693; (3) "Fuel Injector With A Metering Assembly Having A Seat Molded to A Polymeric Support Member," Ser. No. 11/014,691; (4) "Fuel Injector With A Metering Assembly Having At Least One Annular Ridge Extension Between A Valve Seat and A Polymeric Valve Body," Ser. No. 11/014,699; (5) "Fuel Injector With An Armature Assembly Having A Continuous Elongated Armature And A Metering Assembly Having A Seat And Polymeric Support Member," Ser. No. 11/014,698; (6) "Fuel Injector With A Metering Assembly Having A Seat Secured To Polymeric Support Member Having A Surface Surrounding A Rim Of A Polymeric Housing And A Guide Member Disposed In The Polymeric Support Member," Ser. No. 11/014,697; (7) "Fuel Injector With A Metering Assembly Having A Polymeric Support Member Which Has An External Surface Secured To A Bore Of A Polymeric Housing And A Guide Member That Is Disposed In The Polymeric Support Member," Ser. No. 11/014,696; (8) "Fuel Injector With A Metering Assembly With A Polymeric Support Member And An Orifice Disk Positioned A Terminal End Of The Polymeric housing," Ser. No. 11/015,032; and (9) "Method of Manufacturing Polymeric Fuel Injectors," Ser. No. 11/015,032, which are incorporated herein by reference in their entireties into this application.

What I claim is:
1. A fuel injector comprising:
 a polymeric housing having a passageway extending between an inlet and an outlet along a longitudinal axis;

a pole piece disposed in the passageway, the pole piece having a through opening;

a filter assembly having a portion disposed in the through opening of the pole piece;

a coil assembly disposed in the polymeric housing to surround the pole piece;

a spring member disposed partly in the pole piece and including a spring portion contiguous with the portion of the filter assembly;

an armature assembly disposed in the passageway in a first position having a portion confronting the pole piece and in a second position having a closure member contiguous to an end face of the pole piece; and a metering assembly secured to the polymeric housing proximate the outlet, the metering assembly having a seat secured to a polymeric support member, the seat having a sealing member disposed between the seat and the polymeric support member.

2. The fuel injector of claim 1, wherein the seat comprises a metallic seat body having first and second ends spaced apart and about the longitudinal axis to define a perimeter about the longitudinal axis.

3. The fuel injector of claim 2, wherein the perimeter comprises a pocket that retains the sealing member.

4. The fuel injector of claim 3, wherein the first end comprises a tapered surface contiguous to the closure member and the second end comprises a surface contiguous to a metering disc.

5. The fuel injector of claim 4, wherein the passageway comprises a plurality of different diameters along the longitudinal axis.

6. The fuel injector of claim 5, wherein the passageway comprises a portion tapered towards the longitudinal axis to define a guide surface.

7. The fuel injector of claim 6, wherein the polymeric housing comprises a nylon body enclosing the coil assembly coupled to at least one terminal connector.

8. The fuel injector of claim 7, wherein the coil assembly comprises a coil housing disposed about the longitudinal axis to surround a bobbin and at least one wire coiled about the bobbin, the coil housing including a flux washer proximal the first external seal and disposed about the longitudinal axis.

9. The fuel injector of claim 8, wherein the metering assembly further comprises a generally cylindrical member secured to the polymeric support member, the cylindrical member including a central aperture disposed about the longitudinal axis to guide the closure member and at least one aperture offset to the longitudinal axis.

10. The fuel injector of claim 9, wherein the polymeric support member comprises a surface portion secured to the polymeric bore of the polymeric housing.

11. The fuel injector of claim 10, wherein the polymeric support member comprises a pocket disposed about the longitudinal axis to surround an outer surface of the polymeric housing proximate the outlet.

12. The fuel injector of claim 11, wherein the pole piece comprises a resilient element disposed in a bore of the pole piece.

13. The fuel injector of claim 12, wherein the pole piece comprises a member defining a generally cylindrical outer surface, the generally cylindrical outer surface including a portion of the outer surface closer to the longitudinal axis so as to define at least a recess in the outer surface of the member.

14. The fuel injector of claim 13, wherein the pole piece further comprises a fuel filter assembly secured to an inner surface of the pole piece, the fuel filter assembly including a filter element and an end face portion spaced apart from the filter element along the longitudinal axis, the end face portion contiguous to a first end of the resilient element.

15. The fuel injector of claim 14, wherein the filter element comprises a filter element disposed in the polymeric bore so that a gap is provided between the filter element and the bore.

16. The fuel injector of claim 15, wherein the armature assembly comprises an armature having a radially extending surface contiguous to a second end of the resilient element and a generally cylindrical portion contiguous to the guide surface of the polymeric bore, the armature being secured to a non-magnetic elongated member extending along the longitudinal axis, the closure member contiguous to a sealing surface of the metallic seat in one position of the armature assembly to occlude a flow of fuel through the metering assembly, the closure member extending through the central aperture of the guide member.

17. The fuel injector of claim 16, wherein the armature assembly comprises an armature having a surface contiguous to another portion of the resilient element and a generally cylindrical portion contiguous to the guide surface of the polymeric bore, the armature being secured to a closure member that engages a sealing surface of the metallic seat in one position of the armature assembly to occlude a flow of fuel through the metering assembly, the closure member extending through the central aperture of the guide member.

* * * * *